(12) United States Patent
Hilgert (10) Patent No.: US 7,661,444 B2
(45) Date of Patent: Feb. 16, 2010

(54) CORRUGATED PIPE HOSE ASSEMBLY AND CONNECTION METHOD

(75) Inventor: Andreas Hilgert, Sinzheim (DE)

(73) Assignee: Eaton Fluid Power GmbH, Baden-Baden (DE)

( * ) Notice: Subject to any disclaimer, the term of this patent is extended or adjusted under 35 U.S.C. 154(b) by 661 days.

(21) Appl. No.: 10/522,361

(22) PCT Filed: Jul. 24, 2003

(86) PCT No.: PCT/EP03/08148

§ 371 (c)(1),
(2), (4) Date: Jan. 26, 2005

(87) PCT Pub. No.: WO2004/013532

PCT Pub. Date: Feb. 12, 2004

(65) Prior Publication Data

US 2005/0229990 A1    Oct. 20, 2005

(30) Foreign Application Priority Data

Jul. 27, 2002 (DE) ................... 102 34 372

(51) Int. Cl.
*F16L 11/00* (2006.01)
(52) U.S. Cl. ................. 138/109; 138/121; 138/122; 138/114; 285/256; 285/382; 285/903
(58) Field of Classification Search ................. 138/109, 138/121, 122, 114; 285/256, 288.1, 382, 285/903
See application file for complete search history.

(56) References Cited

U.S. PATENT DOCUMENTS 2,309,719 A    2/1943   Vaill
2,666,657 A *  1/1954   Howard et al. ............... 285/49
2,797,111 A *  6/1957   Beazley .................. 285/222.4
3,023,496 A *  3/1962   Millar ........................ 228/182
3,532,131 A * 10/1970   Lefere ........................ 138/114

(Continued)

FOREIGN PATENT DOCUMENTS

DE    73 14 756    7/1973

(Continued)

*Primary Examiner*—James F Hook
(74) *Attorney, Agent, or Firm*—Benesch, Friedlander, Coplan & Aronoff LLP (57) ABSTRACT

The invention relates to corrugated pipe hose assemblies which are not provided with fixtures and which are used to transport preferably gaseous media in high-pressure applications, wherein a mount (3) is provided in order to receive an open end of the corrugated pipe (6) of the corrugated pipe assembly (2) and which is pressed therewith in order to form a metallic seal. The seal is obtained by means of a sealing bushing (25) between the inner wall (18) of one part (16) of the mount and the ribs (8) of the corrugated pipe (6). Another part (17) of the mount (3) firmly holds a section (27) of the covering (11) of the corrugated pipe hose assembly (2) in an axial direction and also with respect to tilting movements such that pivoting movements of the corrugated pipe hose assembly (2) do not result in a relative movement between the corrugated pipe (6) and the mount (3), especially with regard to one part (16). The sealing area thus remains unaffected even when mechanical load of the corrugated pipe hose assembly (1) occurs as a result of traction or bending.

17 Claims, 7 Drawing Sheets

U.S. PATENT DOCUMENTS

| | | | | |
|---|---|---|---|---|
| 4,410,205 | A * | 10/1983 | Ingram | 285/47 |
| 4,805,942 | A * | 2/1989 | Goodridge | 285/222.1 |
| 5,404,632 | A * | 4/1995 | Zaborszki | 29/508 |
| 5,413,147 | A * | 5/1995 | Moreiras et al. | 138/109 |
| 5,644,832 | A * | 7/1997 | Kanao | 29/458 |
| 7,017,949 | B2 * | 3/2006 | Luft et al. | 285/256 |
| 7,328,920 | B2 * | 2/2008 | Schneider et al. | 285/256 |
| 2004/0094953 | A1 * | 5/2004 | Luft et al. | 285/256 |
| 2004/0119283 | A1 * | 6/2004 | Furuta | 285/256 |

FOREIGN PATENT DOCUMENTS

| | | |
|---|---|---|
| DE | 38 08 383 | 9/1989 |
| DE | 199 61 423 | 7/2001 |
| DE | 101 04 448 | 8/2002 |

* cited by examiner

CORRUGATED PIPE HOSE ASSEMBLY AND CONNECTION METHOD

The present invention relates to a corrugated pipe hose assembly and a method for connecting a corrugated pipe hose, in order to create such a corrugated pipe hose assembly.

So-called corrugated pipe hoses are used as fluid conduits, in particular for a movable connection of fluid-transporting aggregates. These assemblies comprise an inner corrugated pipe defining a fluid channel. The corrugated pipe, which consists mostly of metal, is enclosed in a covering which essentially consists of plastic material, elastomer material, as well as other components. This covering frequently is composed of several layers. For example, it consists of a hose core or reinforcement which directly adjoins the corrugated pipe. In many cases, this hose core is provided with a so-called pressure carrier, which consists of a coiled tension-resistant material to ensure resistance to pressure. In most cases, an additional hose cover is applied to the pressure carrier to create an outer protective covering. During the manufacture of such corrugated pipe hoses, individual layers of the covering are extruded onto the corrugated pipe in consecutive steps, which are provided with connection nipples on both ends. However, this limits the pipe length to production-related fixed, predetermined dimensions.

Therefore, the connection of corrugated pipe hoses, which do not have connection nipples, poses a particular problem. Also, users wish to be able to produce, on-site, i.e., independent of a predetermined manufacturing process, the desired connection assemblies from long or continuous semi-finished corrugated pipe hose material, without being dependent on the special deliveries by a corrugated pipe hose manufacturer.

The connection of a corrugated pipe hose with a continuing line or with a fluid-transporting aggregate must be mechanically stable. This connection should provide a lasting seal and should be easy to produce. Neither pressure nor mechanical stresses, as are to be expected in the operation of equipment and aggregates, should or may contribute to leakages or to any other damage of the connection.

If a corrugated pipe hose carries high pressures, ist such pressures are applied at all times, and if the corrugated pipe hose is exposed to temperature changes, vibrations or any other long-term stresses, the connection with a connection nipple can be particularly critical.

In view of this, the problem to be solved by the present invention is to provide a possibility for manufacturing corrugated pipe hose assemblies with the use of corrugated pipe hoses that have not been pre-fabricated, and display particular load-carrying ability.

This problem has been solved by the corrugated pipe hose assembly in accordance with claim 1, as well as by the corresponding connection method:

The inventive corrugated pipe hose assembly comprises a corrugated pipe hose and at least one end mount, which is tightly connected with said corrugated pipe hose. This mount creates an attachment piece, which is connected with a continuing line, for example, a pipe or a fluid channel of a connected aggregate. In order to connect the mount with the corrugated pipe hose, an end section of the inner corrugated pipe of the corrugated pipe hose is exposed and inserted in a first tubular part of said mount. The fitting is deformed in such a manner that the inner wall of a sealing bushing fits tightly against at least one rib of the corrugated pipe in order to create a seal. After being deformed, the preferably initially cylindrical inner wall fits tightly against the rib, so that this rib is pressed firmly against the inner wall. Furthermore, the material of the sealing bushing may protrude in a plastic or elastic manner into a space between the ribs. This press fit creates a reliable seal, in particular, with respect to highly pressurized fluids such as, for example, $CO_2$. Such fluids are increasingly being used as coolants in cooling devices, for example, in the automobile industry. In addition, the tight fit of the corrugated pipe in the first part of the mount—though mechanically buffered by the sealing bushing—effects a vibration-resistant mechanical assembly of the corrugated pipe hose.

Closed ring-shaped spaces remaining between the rib interstices form buffer spaces, which, depending on the diffusibility of the fluid, sooner or later fill with minute amounts of fluid and thus reduce the pressure differential at the respective sealing points. Sealing points are created, respectively, at the points of contact between a rib and the sealing bushing.

The design of the sealing bushing may be completely homogenous. In so doing, it is also possible to provide these sealing bushings with inserts, for example, to create diffusion barriers.

In addition, the mount is connected with the covering of the corrugated pipe hose, for example, by a cupular element, into which the covering projects.

These types of connections can be created on a corrugated pipe hose end at a later time, namely, in that a part of the covering is removed and the corrugated pipe end is secured in the mount.

In order to create the fluid-tight press fit of the corrugated pipe in the first part of the mount, the tubular first part may be deformed in radial direction. This deformation must take place in a ring-shaped region which extends over one or more ribs of the corrugated pipe. This deformation may occur by means of a compression device comprising several press jaws, which move in a radially inward direction and thus cause the tubular part to be narrowed in order to clamp the corrugated pipe in place. By positioning and clamping the corrugated pipe on several ribs, a particularly secure mechanical connection and a good seal are achieved. Optionally, magnetic compression or shrink fitting is possible. The seal created by the sealing bushing may be supplemented by a metallic seal between the corrugated pipe and the mount part. To do so, a section of the mount having a smaller inner diameter is pressed directly on the corrugated pipe. In particular at high pressures, this increases the diffusion resistance even more. Furthermore, the seal may be enhanced and further improved by welding the joint. To do so, for example, the mount part is first pressed together with the corrugated pipe, and, subsequently, the press connection is heated. Heating may be achieved, for example, by means of an induction heating process. A welded joint may form due to the combined action of the force of the pressure on the contact surface between the rib of the corrugated pipe and the inner wall, and due to the short-term high temperature action (i.e., below the melting point of the involved metals).

The first part of the mount may be connected to another fluid channel, for example, by means of a soldered or welded connection, i.e., by inserting an appropriate piece of the conduit in said part and by soldering said part to said conduit. In addition, this conduit s may be soldered or welded to the corrugated pipe. An end section of the corrugated pipe is preferably used for a soldered joint.

The second part of the mount may be in form-closed positive engagement with the covering of the corrugated pipe hose. To do so, the second part may be compressed radially inward, for example, by being pressed together with a narrower or wider ring-shaped section. If this pressure connection is carried out in a narrow ring-shaped section, this section preferably is located between two ribs of the corrugated pipe in order to minimize or prevent a deformation of the corrugated pipe.

The second part of the mount may optionally be provided with a profile on its inside. To do so, the mount's walls may be provided with ribs or even be threaded. As a result of this, a particularly firm connection between the mount and the covering is achieved when these are pressed together.

Advantageous details of the embodiments of the invention result from the following description of the figures, the drawings or the subclaims.

Examples of embodiment of the invention are illustrated by the drawings. They show.

Figure 1:
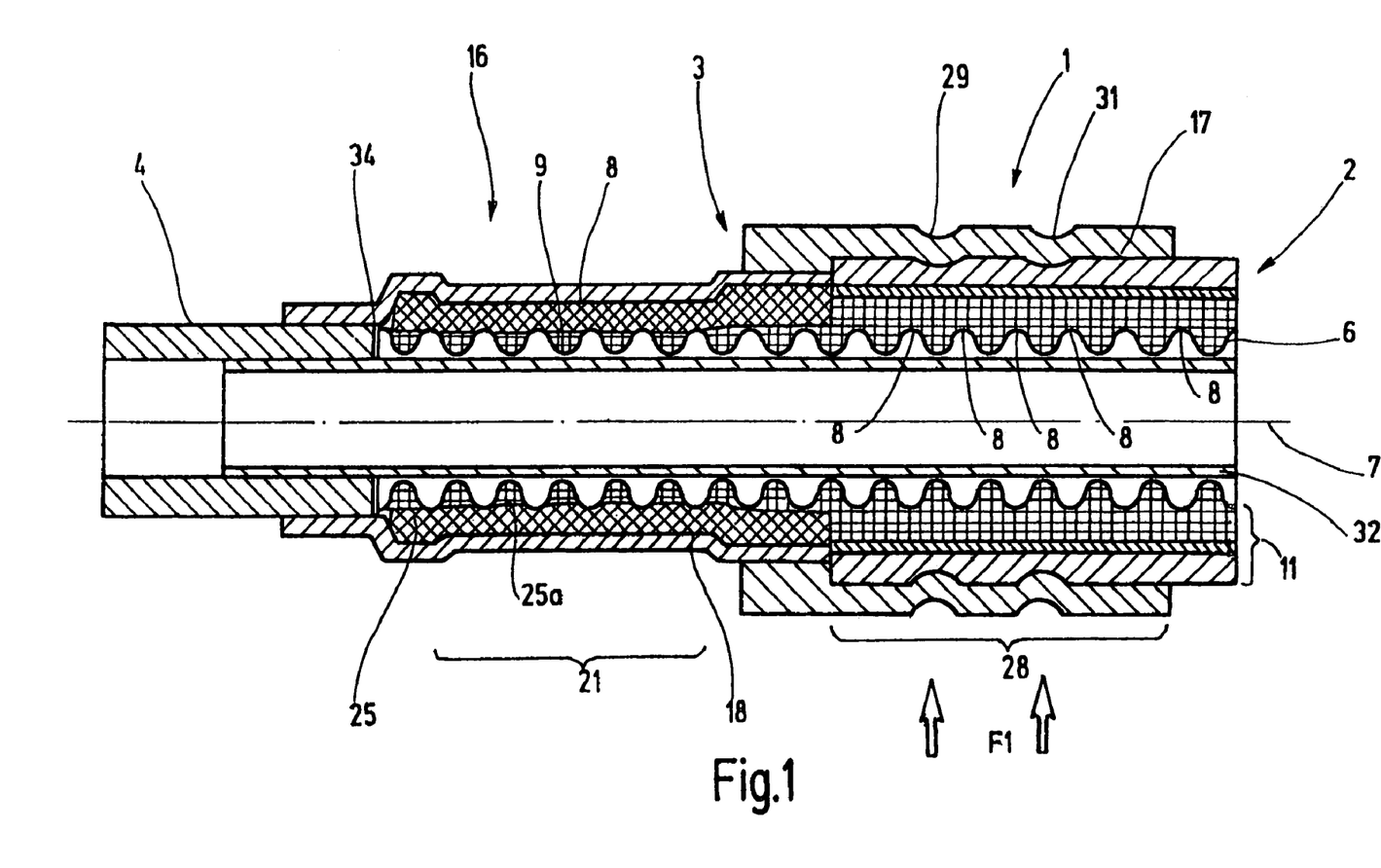
FIG. 1 a detail of a corrugated pipe house assembly, in longitudinal section.

FIG. 1 shows a detail of corrugated pipe hose assembly 1. Corrugated pipe hose assembly 1 comprises a corrugated pipe hose 2, which forms a flexible fluid line. A mount 3 is used to connect corrugated pipe hose 2 with a pipe piece 4 or another conduit means. Instead of pipe piece 4, it is possible to use any other connecting piece which forms a continuing line or which is a component of a connected aggregate. Corrugated pipe hose assemblies of the type illustrated by FIG. 1 are suitable for movable and vibration-resistant fluid connections between individual aggregates or components of the cooling device. Specifically, the corrugated pipe hose assembly 1 is suitable for the connection of fluid-containing spaces, which are subject to high internal pressures of up to several hundred bars.

Corrugated pipe hose 2 contains a corrugated pipe 6. This corrugated pipe 6 has a circular cross-section, in which case the diameter of the corrugated pipe increases and decreases in an undulating manner along its axis 7. Corrugated pipe 6 is a thin-walled metal pipe. As a result of the undulating diameter variation, said pipe has ring-shaped, spaced-apart ribs 8 with interstices 9 between said ribs 8. Ribs 8 form individual rings or a thread.

Figure 2:
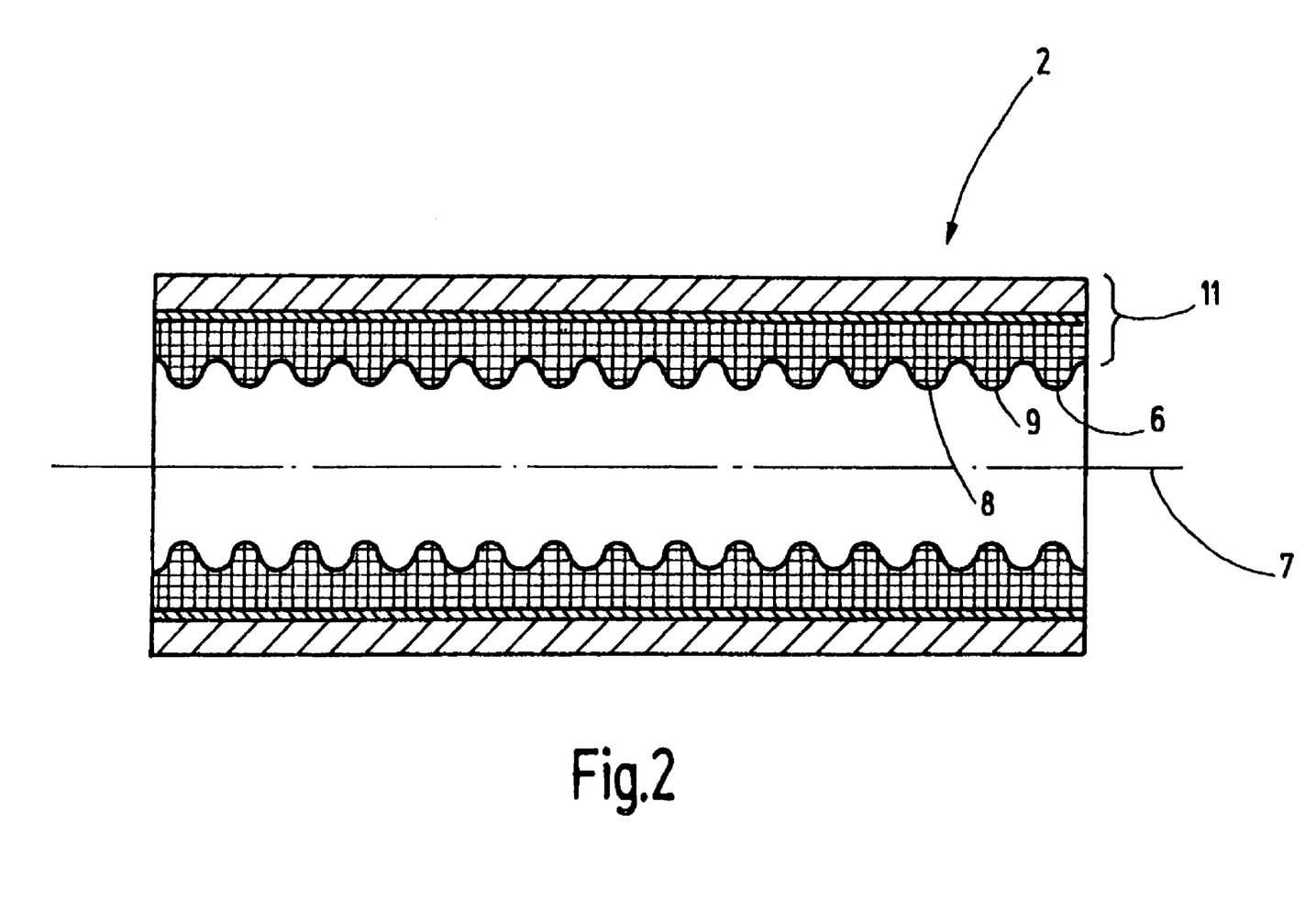
FIG. 2 a detail of a corrugated pipe hose, in longitudinal section.

Corrugated pipe hose 2 is illustrated separately in FIG. 2. Corrugated pipe 6 has a covering 11, which consists of a hose core 12, of a pressure carrier 14 arranged concentrically with respect to corrugated pipe 6 on hose core 12, and of an outer cover 15. Hose core 12, for example, is an elastomer element, which is connected with corrugated pipe 6 by positive material contact and is supported by ribs 8, and which fills interstices 9 between ribs 8. Its cylindrical outer covering is enclosed by pressure carrier 14, which, for example, may be made of a fabric hose, of cross-woven textile filaments or of wires, or a similarly inelastic structure. The outer cover 15, in turn, consists of an elastomer material or a plastic material, which is designed to provide the outer protection of corrugated pipe hose 2.

Figure 4:
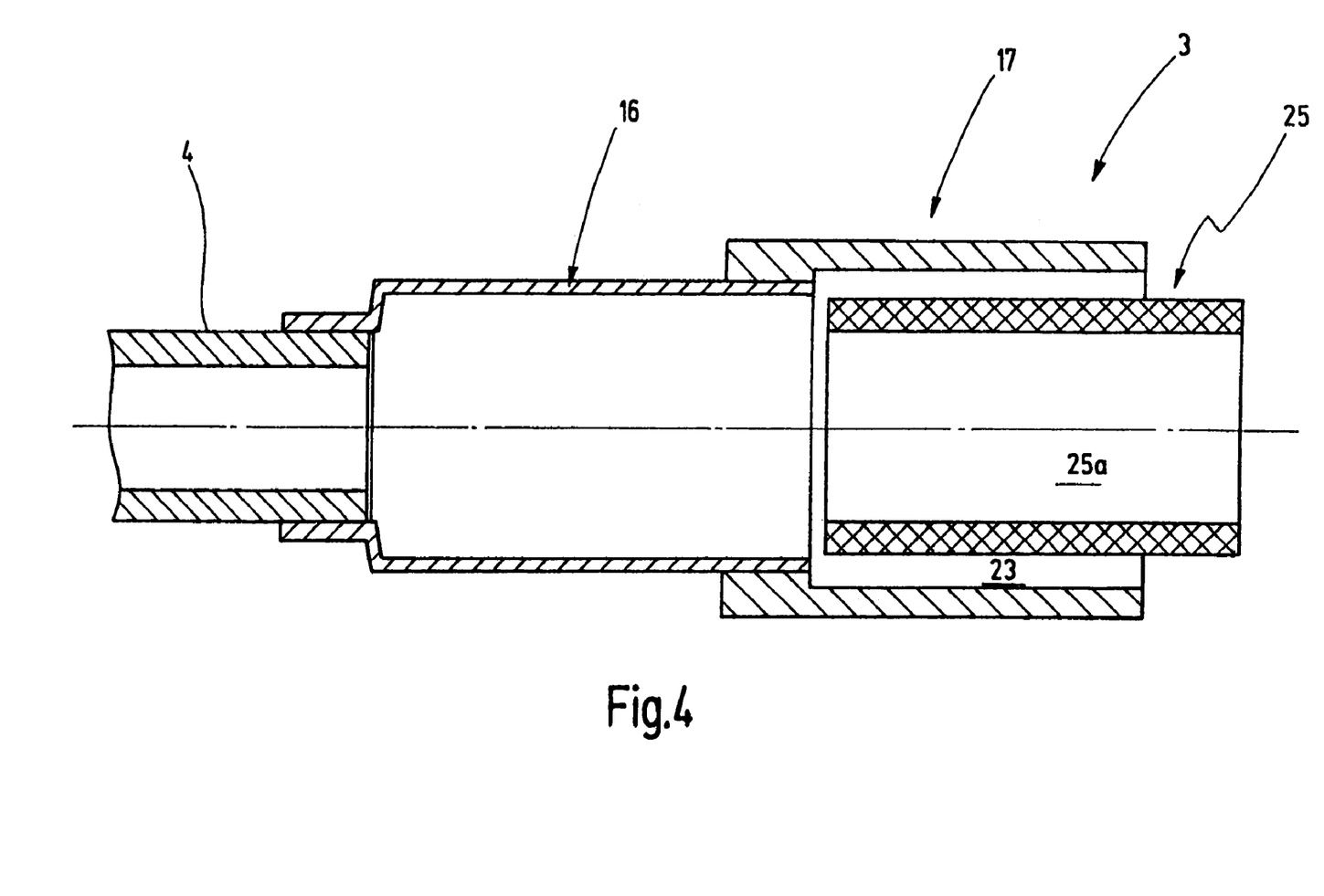
FIG. 4 a view of a mount for said corrugated pipe hose assembly as in FIG. 2, connected to another conduit means, in longitudinal section.

Mount 3, which is shown by itself in FIG. 4, is used for the connection of corrugated pipe hose 2. Mount 3 has a first tubular part 16 and a second cupular part 17. Inner wall 18 of the first part 16 defines a passage opening 19. This opening is approximately cylindrical—at least it has a cylindrical section 21 with a diameter that is slightly greater than the outer diameter of corrugated pipe 6.

The first part 16 extends into the bottom opening of the second part 17 and is connected at this point with the base of the cupular second part 17, for example, by being welded or soldered together or by being designed in one piece. Extending from passage opening 19, which opens into the cup, is a continuing opening 22 through part 17, so that mount 3 is open at both its end sides. Wall 23 of the second part, which defines the opening, is configured, for example, cylindrically smooth.

Figure 3:
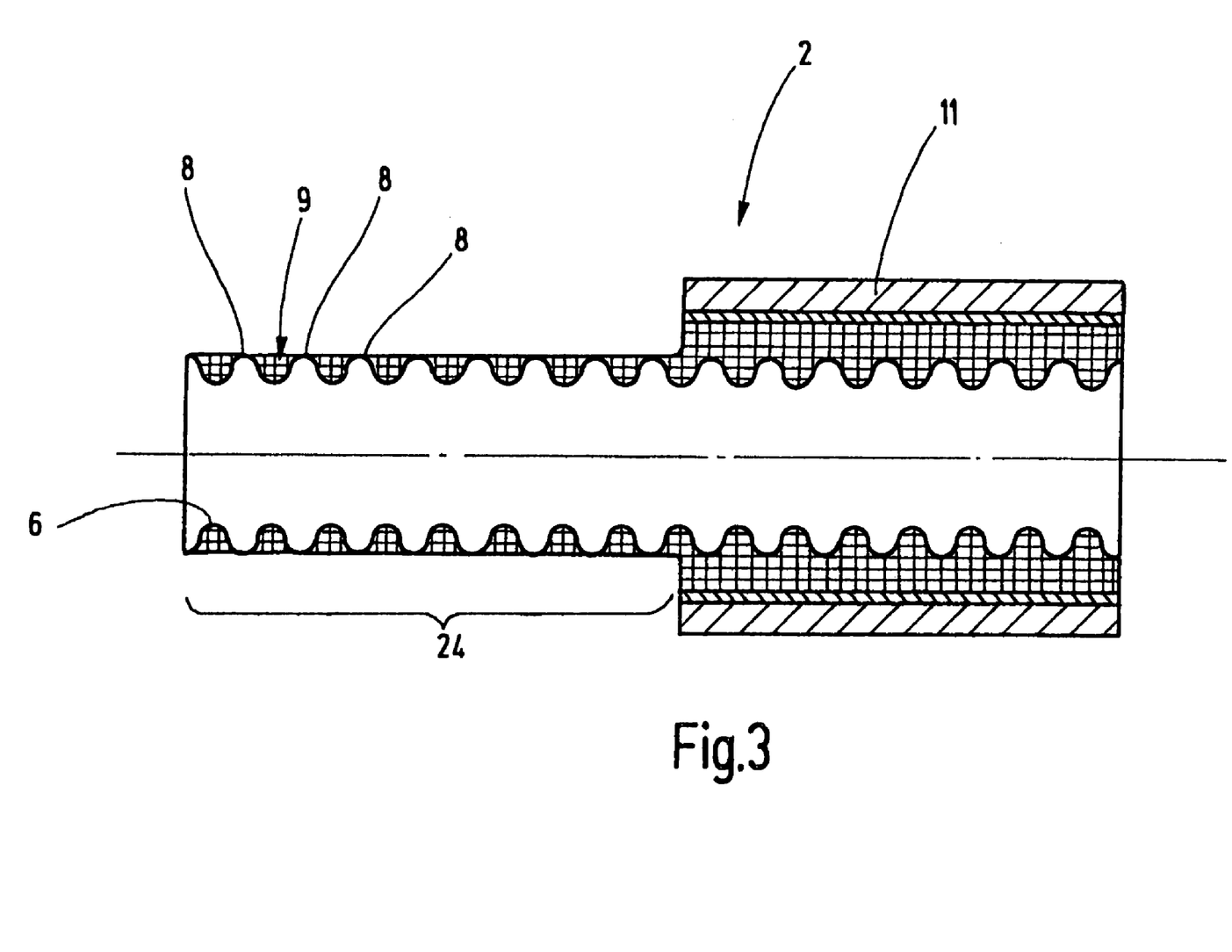
FIG. 3 a view of said corrugated pipe hose as in FIG. 2, with the covering removed from the end section, in longitudinal section.

Mount 3 comprises a sealing bushing 25, which is shown in FIG. 4 before being connected and before pressing together mount 3 with corrugated pipe hose 2. Sealing bushing 25 is configured as a hollow cylinder and has a cylindrical inner wall 25a. On its outside, said bushing has a cylindrical generated surface. The outer diameter of sealing bushing 25 corresponds approximately to, or is slightly smaller than, the inner diameter of part 16. In contrast, the diameter of inner wall 25a is slightly greater than the outer diameter of ribs 8 (FIG. 3). Sealing bushing 25 consists of a deformable material, for example, a plastic material or an elastomer. Preferably, the material can be deformed in an elastic or plastic, or plastic/elastic manner. This material may be a silicone rubber, another rubber or any other suitable plastic material which is not attacked by the fluid to be sealed in. The length of sealing bushing 25 corresponds substantially to the length of part 16. It can be inserted in this part, in which case its end surface, in the transition region between part 16 and pipe piece 4, abuts against an annular shoulder.

Corrugated pipe hose assembly 1 shown in FIG. 1 is manufactured as follows:

First, a desired length of corrugated pipe hose 2 is cut from an appropriate pipe material. Then, in an end section 24 of corrugated pipe 6, covering 11 is removed from corrugated pipe hose 2, a detail of which is shown in FIG. 3. In so doing, end section 24 of corrugated pipe 6 is exposed. In so doing, at least a few ribs 8 of end section 14 are cleaned, for example, by means of rotating wire brushes to such an extent that said sections have a metallically clean surface on the outer periphery of ribs 8. Potentially present elastomer residue from hose core 12 needs not be removed from interstices 9; such residue may remain in the interstices. However, it may be advantageous to clear out interstices 9 in order to create buffer spaces. In any case, the interstices remain filled with the elastomer when ribs 8 form a thread, in order to close the thread between the ribs.

The transition between the exposed end section 24 of the corrugated pipe and the intact covering 11 is configured as an annular shoulder 27, which has a shape that is adapted to the shape of the base of cupular part 17 (FIG. 1). In the present example of embodiment, annular shoulder 27 is configured as a substantially plane ring-shaped end surface of covering 11.

Figure 7:
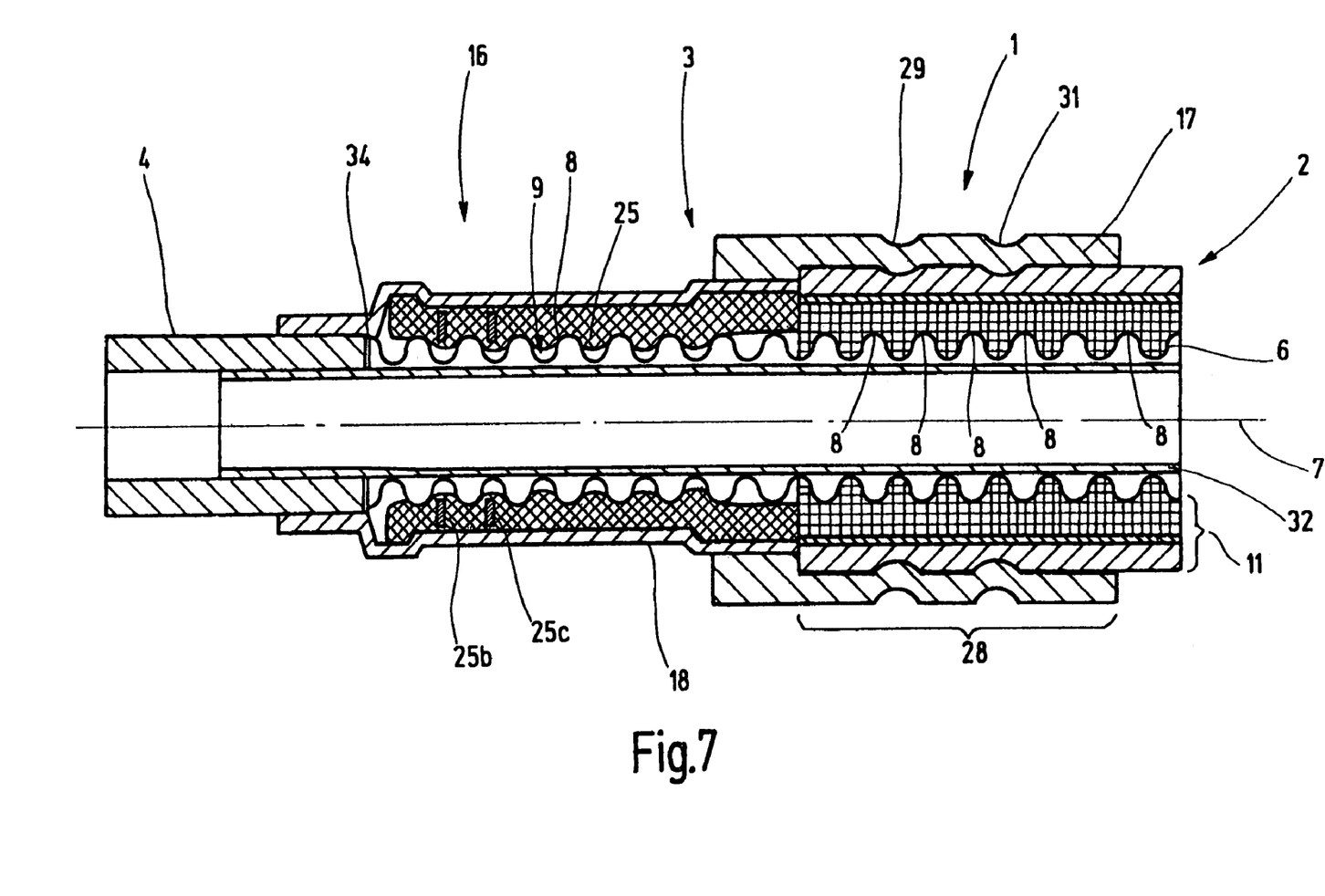

For the continued assembly of mount 3, the prepared end of corrugated pipe hose 2—as can be seen in FIG. 3—is inserted into the mount, as in FIG. 4, until the front end of corrugated pipe 6 abuts against pipe piece 4, and annular shoulder 27 abuts against the base of part 17. FIG. 7 shows this state. In so doing, end section 24 is located in sealing bushing 25. Accordingly, end section 24 is seated with sealing bushing 25 in part 16.

If required, a ring consisting of solder may be interposed between corrugated pipe 6 and the front end of pipe piece 4. Ribs 8 of corrugated pipe 6 are seated with slight play in sealing bushing 25. Sealing bushing 25 and covering 11 of corrugated pipe hose 2 are also seated with slight play in part 17 of mount 3.

If solder is present, a soldering step is now performed; in this case, the end of corrugated pipe 6 is soldered to pipe piece 4 or to part 16 at soldering site 34. If a solder ring has previously been inserted, this soldering step involves heating the appropriate section of mount 3. In so doing, interstices 9 are not filled with solder; they remain empty. During this method step, if necessary, the soldered joint may also be provided between parts 16 and 17, unless this has been done previously. If, however, a soldered joint between the end of corrugated pipe 6 and mount 3, or pipe piece 4, is not desired, the soldering step may be omitted.

In order to seal the fluid channel, i.e., ultimately seal corrugated pipe 6 with respect to pipe piece 4, mount 3 is now converted into the shape shown in FIG. 1. To achieve this, each of the two mount parts (part 16, part 17) is squeezed radially inward in a ring-shaped area (for example, by several radially inward moving press jaws which act on the circumference of part 16). Parts 16, 17 are deformed in a plastic manner. Consequently, the free inner diameter of passage opening 19 is reduced in section 21. As a result, sealing bushing 25 is squeezed onto end section 24 and its inner wall 25a abuts—under radially inwardly directed initial tension—against the ribs and against the elastomer residue remaining in the interstices. This, and the press fit of sealing bushing 25 on inner wall 18 in part 16, produce a secure seal.

In section 28, ring-shaped radially inward-deformed press sections 29, 31 are created, which, in axial direction, correspond to interstices 9 between ribs 8, and which clamp covering 11 in place by form-closed and frictional engagement. As a result of this, covering 11 of corrugated pipe hose 2 is held firmly in mount 3 in axial direction. However, the seal is achieved by the metallic press fit between inner wall 18 and the peripheral surfaces of ribs 8 in section 21.

As shown by FIG. 1, corrugated pipe 6 may contain a hose or flexible pipe 32, which projects—without play—into pipe piece 4 and covers ribs 8 in the direction toward the fluid channel. This is possible in particular because mount 3 connects the corrugated pipe hose without reducing the inner diameter of said hose at any point. Pipe 32 may be used to minimize noise developed by a fluid stream, as well as to reduce flow resistance. However, it may optionally be left out.

Figure 5:
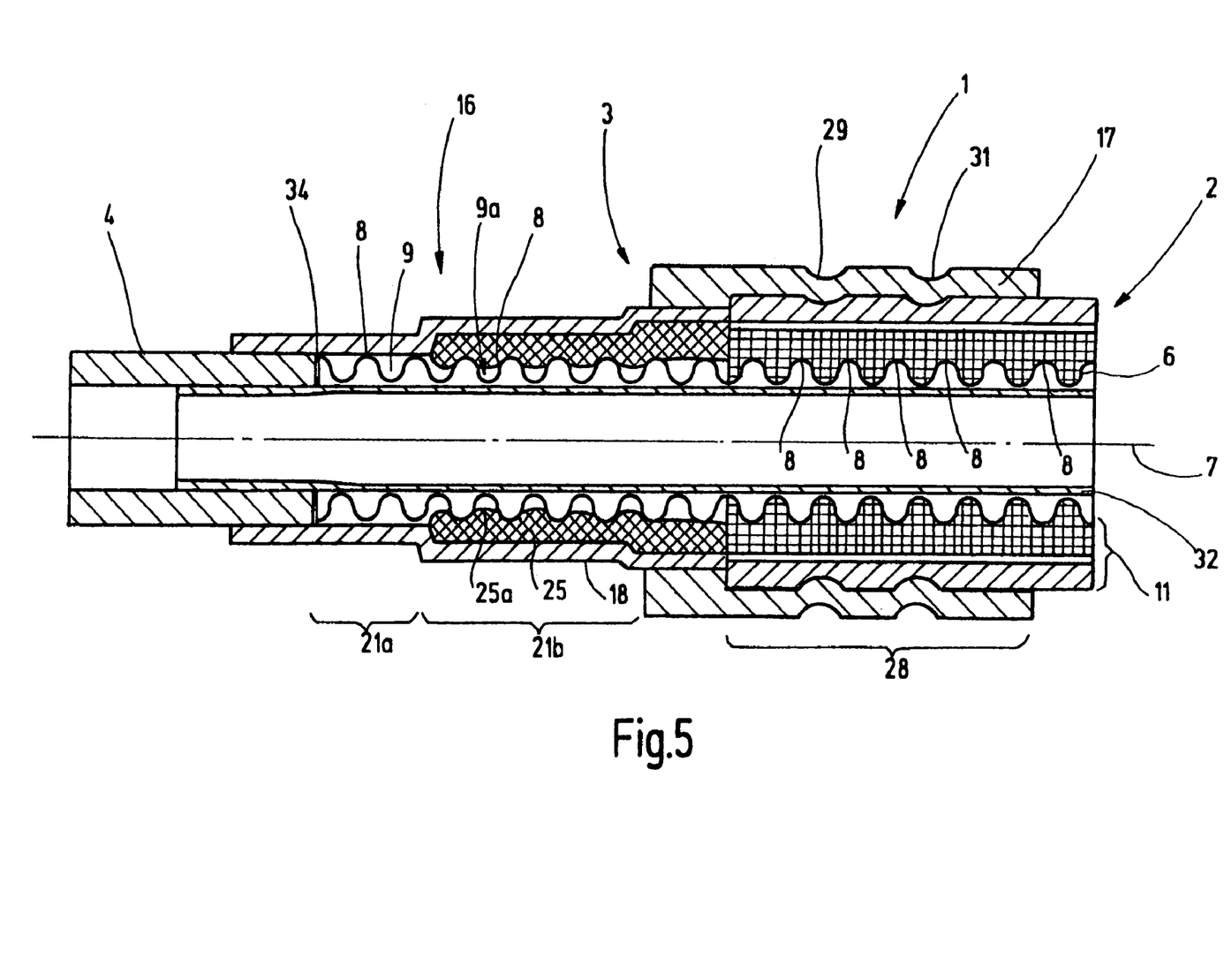
FIG. 5-7 modified embodiments of a corrugated pipe hose assembly in pressed-together state, viewed in longitudinal section.

FIG. 5 shows a modified embodiment of mount 3. This mount corresponds substantially to the above-described mount 3; the differences are as follows:

The mount shown in FIG. 5 has, as a sealing means, not only a sealing bushing 25 but, in addition, a metallic seal. To achieve this, the first part 16 is divided such that it comprises a section 21a having an inner diameter, which corresponds approximately to, or slightly exceeds, the outer diameter of ribs 8; part 16 also comprises a second section 21b having an inner diameter, which corresponds to the outer diameter of sealing bushing 25. When pressed together, both sections 21a, 21b are pressed together in radially inward direction, as a result of which a metallic seal is created with respectively the outer apex of each rib 8 in section 21a. The compression of section 21b causes bushing 25 to be squeezed in and, hence, an elastomer seal is created. In this embodiment, interstices 9 are preferably emptied in order to create buffer spaces 9a. However, it is not necessary to empty interstices 9.

Figure 6:
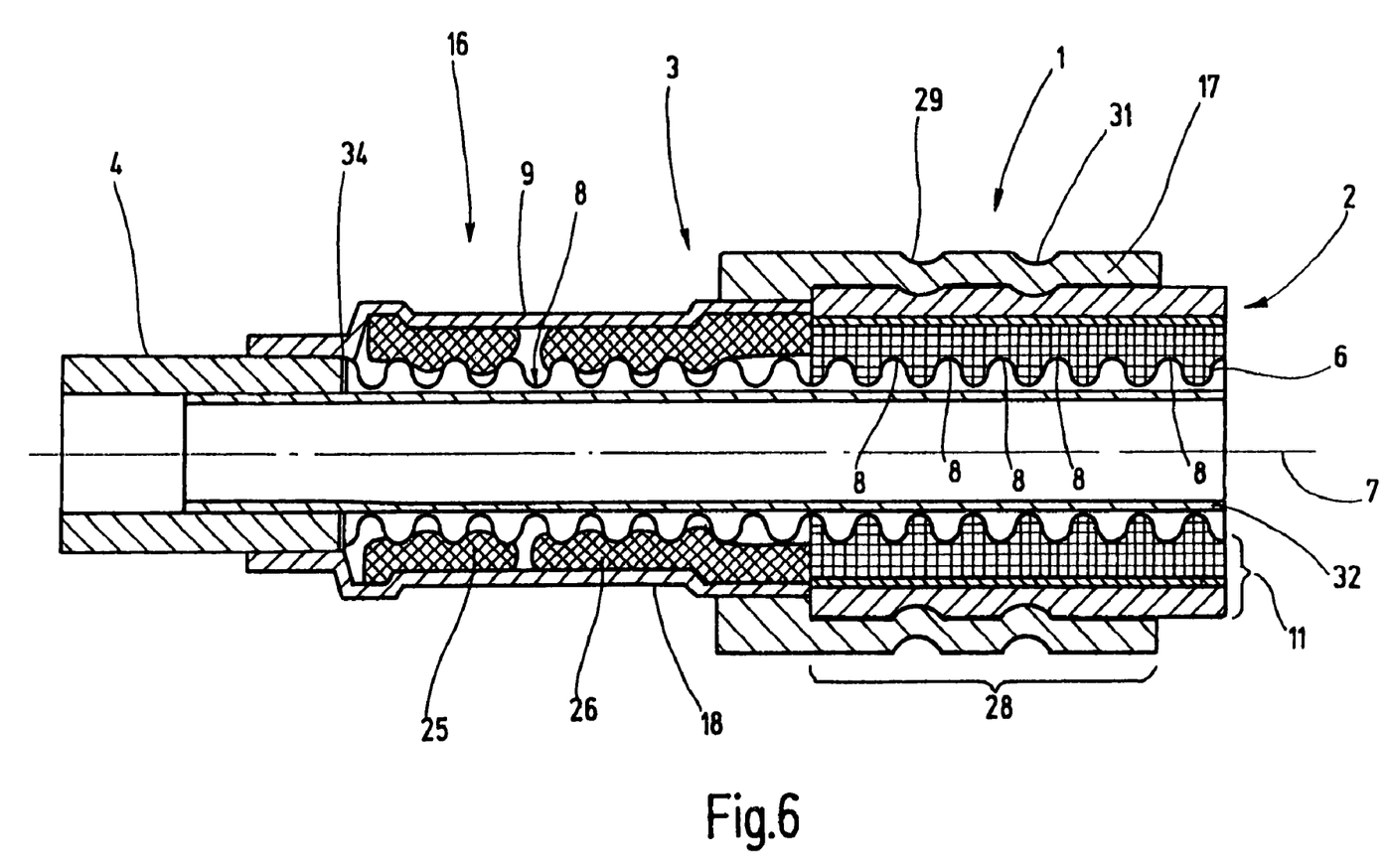

FIG. 6 shows another modified embodiment which largely corresponds to the embodiment of FIG. 1. However, in addition to sealing bushing 25, another sealing bushing 26 located at a small axial distance from sealing bushing 25 is provided. It is also possible for sealing bushings 25, 26 to abut against each other end-to-end. This embodiment offers the possibility of making sealing bushings 25, 26 of different materials. For example, different strength, elasticity or chemical resistance properties may exist. This embodiment offers the possibility of adapting the sealing array in an optimal manner even to difficult conditions.

Finally, FIG. 7 shows another modified embodiment of mount 3 and the seal that can be achieved therewith. Different from the embodiment as in FIG. 1, in this case, sealing bushing 25 is not designed in a homogenous manner, instead it contains inserts 25b, 25c. These, as illustrated, may have the form of flat metal rings inserted coaxially in the bushing in order to create diffusion barriers and in order to limit the radial compressibility of sealing bushing 25. Ring-shaped inserts 25b, 25c are preferably located in the region of interstices 9. As shown, these inserts may have a rectangular, square or even round cross-section. In this embodiment, the interstices are preferably cleaned out. However, it is also possible to omit the emptying step in the region of the inserts, in order to achieve a particularly high degree of compression between the remaining elastomer residue and sealing bushing 25.

Other than that, the description of the embodiment of FIG. 1 applies analogously to that of the embodiments of FIG. 6 and FIG. 7.

Considering the modification of the above-described embodiments, sealing bushing 25 may feature, from the start, an allowance for part 16 and may be pressed into said part. This bushing may also consist of a adhesive material that can be activated by deformation, or of a heat-fusible material, or the like.

Considering the mount of the above-described embodiments, wall 23 of part 17 may be provided with a profile. This profile may consist of individual ring-shaped ribs, which are arranged concentric to axis 7. In its original state, i.e., when part 17 has not been deformed yet, the inner diameter of ribs 33 is large enough that it exceeds the outer diameter of cover 15. Consequently, section 28 of the covering can easily be inserted in mount 3. During compression (radial compression of part 17), ribs 33 protrude into cover 15 of corrugated pipe hose 2 and secure said corrugated pipe hose by creating a form-closed fit. This embodiment is of importance, in particular, when the radially inward peripheral force for the deformation of part 17 is to be applied as a force application in a relatively wide annular section of part 17, so that almost the entire wall 23 can be deformed radially inward. Instead of ribs 33, a tapping screw thread may be provided, which cuts into cover 15 when mount 3 is screwed to corrugated pipe hose 2.

For the connection of corrugated pipe hoses, which are not provided with fittings and are designed preferably for the transport of gaseous media in high-pressure applications, a mount 3 is provided, which receives an exposed end of corrugated pipe 6 of corrugated pipe hose 2 and is pressed together with said hose in order to create a metallic seal. This seal is achieved by a sealing bushing 25 located between inner wall 18 of part 16 of the mount and ribs 8 of corrugated pipe 6. Another part 17 of mount 3 holds a section 28 of covering 11 of corrugated pipe hose 2 in axial direction and also with respect to tilting movements, such that the pivoting movements of corrugated pipe hose 2 do not result in a relative movement between corrugated pipe 6 and mount 3, specifically with regard to part 16. Thus, the sealing area remains unaffected, even when mechanical traction or bending stresses act on corrugated pipe hose assembly 1.

The invention claimed is:

1. A corrugated pipe hose assembly for pressurized devices comprising:
    a corrugated pipe hose comprising a corrugated pipe, which has a plurality of helical or ring-shaped ribs arranged axially at a distance from each other, and which is enclosed by a covering, which encloses the corrugated pipe with the exception of at least one end section;

a mount, which has a first tubular part with a passage opening for receiving the end section and a second tubular part with an opening for receiving a section of covering, in which case the passage opening is defined by an inner wall of the first part and the opening is defined by a wall of the second part;

a conduit means, which is connected with the mount in a fluid-tight manner; and at least one sealing bushing having an inner cylindrical wall and located in the first tubular part, the inner cylindrical wall disposed in a press fit with the plurality of ribs of the corrugated pipe hose and the inner wall of the first tubular part such that the ribs of the corrugated pipe hose do not directly contact the first tubular part, wherein the at least one sealing bushing is elastically deformed by deforming the first tubular part of the mount.

2. The corrugated pipe hose assembly as in claim 1, characterized in that the tubular part is a metal pipe which is deformed in its radial direction such that the sealing bushing abuts, in a sealing manner, between its inner wall and the plurality of ribs of the corrugated pipe, in which case a fluid-tight press fit is created between the first part and the corrugated pipe.

3. Corrugated pipe hose assembly as in claim 1, characterized in that the first tubular part (16) is deformed in its radial direction such that it presses the inner wall (25a) of the sealing bushing (25) against several ribs (8) of the corrugated pipe (6) in order to create a seal, and that, between the first part (16) and the corrugated pipe (6), with the sealing bushing (25) being interposed, a fluid-tight press fit is created.

4. The corrugated pipe hose assembly as in claim 1, characterized in that the first part can be plastically deformed.

5. The corrugated pipe hose assembly as in claim 4, characterized in that the plastic deformation in a ring-shaped section of the first part is directed radially inward.

6. The corrugated pipe hose assembly as in claim 1, characterized in that the mounted sealing bushing can be plastically deformed.

7. The corrugated pipe hose assembly as in claim 1, characterized in that the deformed sealing bushing creates a form-closed connection between the corrugated pipe and the deformed first part.

8. The corrugated pipe hose assembly as in claim 1, characterized in that the sealing bushing is made of a single material.

9. Corrugated pipe hose assembly as in claim 1, characterized in that the sealing bushing (25) comprises at least one insert (25b) of a different material.

10. Corrugated pipe hose assembly as in claim 9, characterized in that the conduit means (4) is soldered to the first part (16) and to the corrugated pipe (6).

11. Corrugated pipe hose assembly as in claim 1, characterized in that the sealing bushing (25) is associated with another sealing bushing (26) which, in axial direction, adjoins the sealing bushing (25) or is arranged at a distance from said bushing (25).

12. The corrugated pipe hose assembly as in claim 1, characterized in that the corrugated pipe is connected with a conduit means.

13. The corrugated pipe hose assembly as in claim 1, characterized in that the first part and the second part are joined by welding or soldering, or are connected in one piece.

14. The corrugated pipe hose assembly as in claim 1, characterized in that the second part is in form-closed engagement with covering.

15. The corrugated pipe hose assembly as in claim 1, characterized in that the second part is pressed together with the covering.

16. The corrugated pipe hose assembly as in claim 1, characterized in that the second part is provided with an inner profile.

17. The corrugated pipe hose assembly as in claim 1, characterized in that the corrugated pipe contains a hose.

* * * * *